INVENTORS
JOHN F. PRICE
GERALD R. CURTIS

JOHN F. PRICE
GERALD R. CURTIS
INVENTORS

BY Philip Subkow

ATTORNEYS

Dec. 15, 1964    J. F. PRICE ETAL    3,161,821
WHEATSTONE BRIDGE TRANSDUCER CIRCUITS
WITH EXTERNAL BALANCING MEANS
Filed July 2, 1962    4 Sheets-Sheet 3
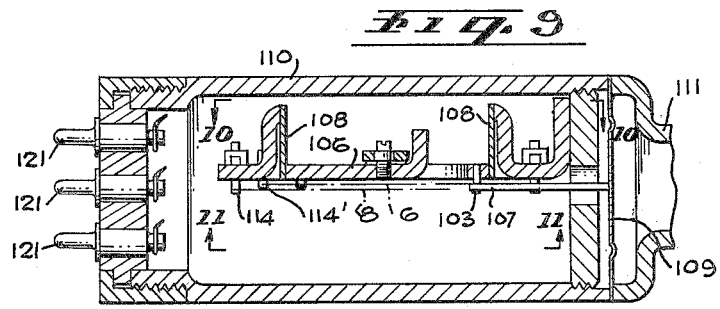
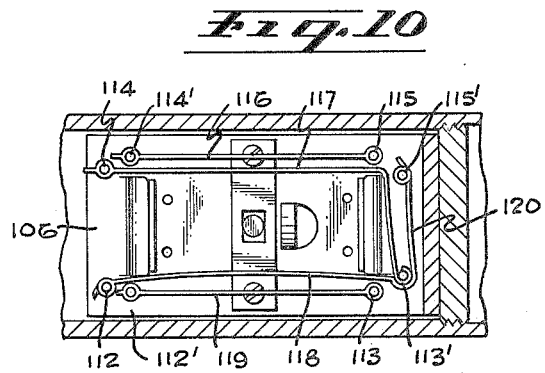
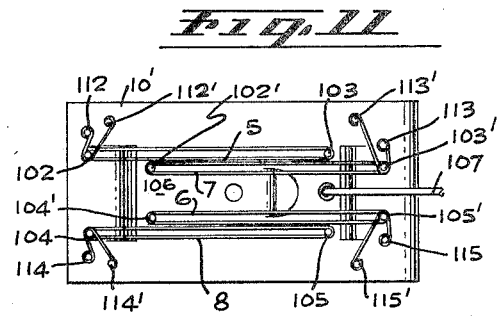
JOHN F. PRICE
GERALD R. CURTIS
INVENTORS
BY
ATTORNEYS

JOHN F. PRICE
GERALD R. CURTIS
INVENTORS

United States Patent Office 3,161,821
Patented Dec. 15, 1964

3,161,821
WHEATSTONE BRIDGE TRANSDUCER CIRCUITS WITH EXTERNAL BALANCING MEANS
John Francis Price, Van Nuys, and Gerald Richard Curtis, La Canada, Calif., assignors to Statham Instruments, Inc., Los Angeles, Calif., a corporation of California
Filed July 2, 1962, Ser. No. 206,777
13 Claims. (Cl. 323—75)

This invention relates to Wheatstone bridge circuits and transducers employing the same, whereby the voltage output of said bridge resulting from a voltage unbalance of the impedances of said bridge, herein referred to as the error signal, may be translated and reported as a multiple of said unbalanced voltage across the output.

For many forms of transducers the attainable voltage output as a result of the permissible unbalance of the impedances of the arms of the bridge, for voltage sources available to power the bridge, is a low voltage output. Thus, for example, in resistance bridges of the type employed in transducers employing strain sensitive filaments such as metallic wires or semiconductor bodies, of the bonded or unbonded type, the voltage output of the bridge resulting from permissible variations in strain in the wires or other filaments is in the millivolt range per volt input. Because of the restrictions on the total resistance of the bridge arising from the limitations of design of such transducers, and also because of the usual limitations on the magnitude of the voltage sources to power the bridge, the voltage output is usually lower than is desirable for telemetering purposes. It is desirable for such purposes that the output of the bridge be in voltage range rather than in the millivolt range.

While amplification of the voltage output by D.C. or A.C. amplifiers is available, these amplifiers introduce problems of linearity, stability and complexity.

As is well known in Wheatstone bridge theory, when current is applied to opposite corners of the bridge, no voltage will appear across the remaining two opposite corners when the four bridge impedances bear the proper relationship. This bridge is said to be balanced. When the bridge is unbalanced, on alteration of the impedances of the arms of the bridge, the voltage drop across each of the four arms of the bridge is individually changed so that a finite voltage difference, herein termed the output voltage, appears across the output corners of the bridge. Thus, in the arms where the impedance is increased, there is an increased potential difference over that occurring with the bridge in its initial balanced position. In the arms whose impedance is decreased, there is a decrease in the potential drop in said arms. However, the total current to the bridge and the currents through the individual arms are not changed so long as the total bridge resistance and input voltage are not changed. The current pattern is not changed, and the bridge current divides itself between the impedances in parallel across the input in proportion to the impedances of each parallel path.

The total voltage appearing at the output corners of the bridge depends on the impedances of the arms of the bridge, the voltage applied to the bridge, and the percentage change in impedance imposed on each arm of the bridge when the bridge is unbalanced.

It is an object of our invention to reduce the voltage difference appearing at the output corners of the bridge to a desired level and, if desired, to substantially the same potential by connecting the bridge to a source of current which is applied to the bridge in current assist relation to modify the current in the several arms of the bridge in a manner to reduce the output voltage to the desired level, which ideally may be zero. The current passing to the bridge to cause this modification, herein referred to as the rebalancing current, is a measure of the bridge unbalance resulting from the change in the impedances of the arms. It is maintained substantially constant, and the bridge is maintained at the rebalanced level, so long as the impedance change and the input potential remains constant. Any change in the impedances of the arms results in a proportional change in the rebalancing current.

In our invention the current passing from the input in the arms whose impedances have been reduced is increased in value, and thus the potential drop in this arm is increased. The current passing from the input in the arms whose impedances have been increased is decreased in value, and the potential drop in these arms is decreased. This is accomplished by circulating a rebalancing current into the arms of the bridge to counteract the effect of the change in impedance which caused the initial unbalance, and to obtain a ratio of voltage drop across several arms required to obtain the desired voltage difference across the output corners.

We may, if desired, bring this potential difference substantially to zero. The bridge is thus balanced, and we may thus eliminate, in practical effect, a potential difference at the output corners of the bridge.

The potential due to unbalance of the impedance and appearing across the output corners is changed in amount proportional to the magnitude of the rebalancing current. We may measure this current or develop as a result of this current a function thereof, for example, a potential. This current or function thereof, e.g. the potential, will be proportional to the magnitude of the reduction in the unbalanced voltage resulting from the unbalancing of the impedances, but can be any desired multiple or fraction or other function thereof. Where the unbalance is substantially entirely removed, the current or function is a measure of the magnitude of the original unbalance.

The rebalancing voltage and rebalancing current may be applied from an independent second source and manually adjusted until the voltage difference between the output corners is brought to the desired degree of difference. Instead of doing so manually, we may adjust the rebalancing voltage through an electro-mechanical servo-system which varies the applied voltage in response to the voltage developed across the output corners of the bridge, until they are at the desired degree of difference in potential.

Preferably, however, we employ an electrical servo-circuit, wherein the voltage difference at the output corners developed when the bridge impedances are unbalanced, acts as an error signal to a servo-system, which applies a voltage back to the bridge, to reduce the error signal to the desired degree.

These and other objects of our invention will be further described by reference to the drawings, of which;

FIG. 9 is a vertical section, partly in elevation, of one form of transducer to which the Wheatstone bridge circuit of our invention may be applied;

FIG. 10 is a section on line 10—10 of FIG. 9; and

FIG. 11 is a section on line 11—11 of FIG. 9.

Figure 1:
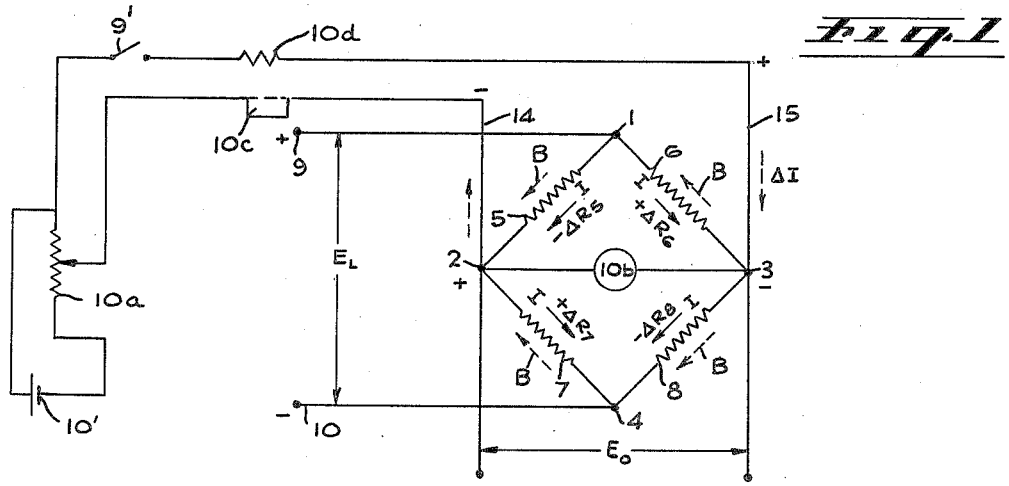
FIGS. 1–8 are schematic diagrams illustrating our invention.

In FIG. 1, the Wheatstone bridge is composed of the arms 5, 6, 7 and 8, connected electrically to input power source at 9 and 10 at the input corners 1 and 4 and to an output circuit at the output corners 2 and 3 of the bridge. The arms 5 and 8, and also 6 and 7, are termed opposite arms of the bridge; and arms 5 and 6, 5 and 7, 7 and 8, and 8 and 6 are termed adjacent arms.

Assume switch 9' open and that the polarity of the power source is as shown in FIG. 1, with 9 positive with respect to 10 (that is, 9 at a higher potential than 10), and that the impedances of the arms are altered, for example, by application of pressure to increase the tension in 5 and 8 and decrease tension in 6 and 7, so that 2 is positive with respect to 3, i.e., at a potential higher than 3. In this application the reference point is not necessarily ground, and the voltages are referenced as indicated. Positive and negative are used to symbolize levels of voltage.

The bridge is unbalanced to the extent of the potential difference between 2 and 3, i.e. the bridge is polarized at the output corners as indicated above. For convenience, in our discussion of our invention, we name this unbalance the error signal. In the conventional systems, this unbalance may be measured or employed in a telemetering circuit responsive to the condition sensed by the transducer.

Such bridges are common in intelligence systems reporting the output of transducers such as, for example, pressure gages, accelerometers, vibrometers, displacement meters and other devices in which a condition to be sensed is translated to vary the impedances of one or more of the arms of a Wheatstone bridge, and the unbalance of the bridge is a measure of the condition to be sensed. The transducer may vary one or more arms, and the remaining arms may be fixed resistors built into the transducer or placed in the external circuitry. However, all of the arms may be varied in impedance by the transducer.

Examples of such transducers are the electrical resistance strain wire transducers known as Statham gages, as illustrated, for example, by Patents 2,573,286; 2,600,701; 2,760,037; and 2,840,675 shown in FIG. 10 and more fully described below. Transducers in which the impedance element of the bridge may be resistive are illustrated, for example, in Patent 2,958,056. While the bridge of FIGS. 1 and 9–11 is illustrated as a resistance bridge, for example, one such as is used in gages of the bonded or unbonded wire or semi-conductor or piezo-resistive filament type, the bridge may be an inductance, capacitance or mixed impedance bridge, wherein the magnitude of the inductance, capacitance or resistance creates the aforesaid unbalance.

In the following discussion, what is said of resistance bridges will be understood to apply to bridges generally.

FIGS. 9–11 illustrate a transducer in the form of a pressure transducer similar to that shown in Patent 2,573,-286, to which the Wheatstone bridge circuit of our invention may be applied. The frame is mounted on the case 110, and the armature 106 is suspended on the frame by leaf springs 108.

Sapphire or other insulating pins 102′, 103, 105 and 104′ are mounted on the armature 106, and similar pins 102, 103′, 105′ and 104 are mounted on the frame. Electrical resistance metallic strain wires are wound in tension between the pins to form the Wheatstone bridge. Thus, for example, the arms of the bridge in FIG. 1 are wound, arm 5 between 103 and 102, arm 7 between 102′ and 103′, arm 6 between 104′ and 105′, and arm 8 between 104 and 105. The ends of the loops of wire forming each arm are connected to insulated terminals. Arm 8 is connected to terminals 114 and 114′; arm 6 to 115 and 115′; arm 7 to 113 and 113′; and arm 5 to 112 and 112′. These terminals are connected on the reverse side of the frame (see FIG. 10) by electrical conduits into the Wheatstone bridge by connection to four terminals 121, of which only 3 appear in FIG. 9. Fixed resistors may be incorporated, for example, to balance the bridge or to provide for zero drift and span compensation, as described herein, and also to provide for the fixed resistors to form part of the bridge arms, as described herein.

The armature 106 is connected by a rod 107 to the diaphragm 109, which is subjected to pressure entering through bore 111 in the case 110, mounted in fluid seal relationship to the diaphragm 109 and the case 110.

The application of pressure to the diaphragm will displace the armature, to increase the tension and resistance in arms 6 and 7 and decrease the tension and resistance in arms 5 and 8. The unbalanced voltage appearing at 2 and 3 is thus a measure of the magnitude of the applied pressure.

For telemetering purposes it is desired that the output voltage which is to be generated on application of the condition to be sensed be of the order of volts. This invention relates to means for attaining such values. While of particular utility as applied to strain gage bridges and other types in which the bridge output is in the millivolt range, it may be applied to other bridge circuits where a translative multiplication or diminution of the bridge output is desired.

As is well known in bridge theory, if in FIG. 1 the impedance of arm 5 is $R_5$, the impedance of arm 6 is $R_6$, the impedance of arm 7 is $R_7$, and the impedance of arm 8 is $R_8$ and the excitation voltage input to 1 and 4 via 9 and 10 is $E_i$, the excitation current I to the bridge will divide itself, $I_1$ passing through resistances $R_6$ and $R_8$, and $I_2$ through $R_5$ and $R_7$, for example as illustrated by the solid arrows in FIG. 1.

When the bridge is in balance, the potential at 2 ($E_2$) is equal to that at 3 ($E_3$), so that the potential difference between them, $E_o$, is 0:

$$I_2R_5/I_2R_7 = I_1R_6/I_1R_8 \tag{1}$$

Where all the resistances are equal, the current $I_2$ equals $I_1$ and is equal to I/2.

If the impedances are changed so that, for example, $R_5$ is now $R_5 - \Delta R_5$ and $R_6$ is now $R_6 + \Delta R_6$ and $R_7$ is now $R_7 + \Delta R_7$ and $R_8$ is now $R_8 - \Delta R_8$, the above equality of Equation 1 no longer exists, and a potential $E_o$ appears between 2 and 3 whose polarity and magnitude depends on the relative values of the unbalanced resistances, i.e., on the differences in the above ratios. A measure of $E_o$ is then a measure of the difference in the ratios of Equation 1.

Where the R values and $\Delta R$ are all equal and of the sign as indicated above, as is the usual case in the above transducers, this unbalance is:

$$E_o = E_1 \Delta R / R \tag{2}$$

where $E_o$ is the output voltage between 2 and 3, and $E_1$ is the voltage between 9 and 10 i.e., the excitation potential. In such case $E_o$ is also a measure of the ratio of the impedances of adjacent arms.

The bridge may be re-balanced if we apply another potential to the bridge from a second current source, i.e., a rebalancing potential in current assist relationship. The potential comes from a source polarized so that the output at the higher potential is connected to the lower potential output terminal. Employing our invention the plus of the second voltage source is connected to the minus output terminal of the bridge. The current I in each arm shown by solid arrows A is modified by a current $\Delta I$ shown by dotted arrows B so that the potential difference across each of the several arms of the bridge satisfies the equality of Equation 1 in substantial and practical effect.

Thus, in FIG. 1, by closing switch 9′ and adjusting the potentiometer 10a, a positive voltage may be applied to 3, and a rebalancing current passes into the bridge through the resistors 10d and 15 until the null sensor 10b, which may be a galvanometer, reports the bridge to be in balance. The resistance 10d is of magnitude sufficient to prevent shorting of the bridge when the resistances of the arms are all equal. The current or some function thereof may be reported at 10c and will be a measure of the initial potential between 2 and 3 which is nulled by the re-balancing current from the battery 10′.

The battery 10′ is connected in current assist relationship with the positive and negative to the bridge so that the currents in the several arms are modified, as is illustrated in FIG. 1, the current introduced from 10a, shown by the dotted arrows B, adding vectorially with the currents flowing in the bridge from the input potential $E_1$ applied at 9 and 10 and shown by arrows A. As will be seen, the currents in 5 and 8 are increased in value, and thus the potential drop across these arm is increased; and the current in 7 and 6 is decreased in value, to reduce the potential drop across these arms.

The current ΔI passing from 10a required to accomplish such re-balance, here referred to as the rebalancing current, or local current, or some function thereof, may be measured and will be responsive to and a measure of the unbalanced voltage $E_o$ resulting from the change in the impedances of each of the arms, which change in impedance resulted in turn in the establishment of the voltage $E_o$.

It will be noted that, so long as the input potential $E_i$ remains unchanged, the bridge remains in balance, even though the value of ΔR should change. If ΔR changes, requiring a change in the current ΔI the bridge will be maintained in the rebalanced condition by adjusting the value of the current ΔI by adjustment of the potentiometer 10a.

We have thus devised a system whereby the voltage unbalance of a bridge may be reduced and, if desired, eliminated, by the application of a rebalancing current and voltage applied to the bridge while the bridge impedances are unbalanced; and the magnitude of the current or related voltage may be a measure of the impedance change and may be utilized in intelligence and telemetering or like service.

Various circuits for accomplishing this result, and which embody the principles of the invention, are illustrated by FIGS. 2–8. Other configurations will suggest themselves to those skilled in the art from the herein description of our invention.

Figure 2:
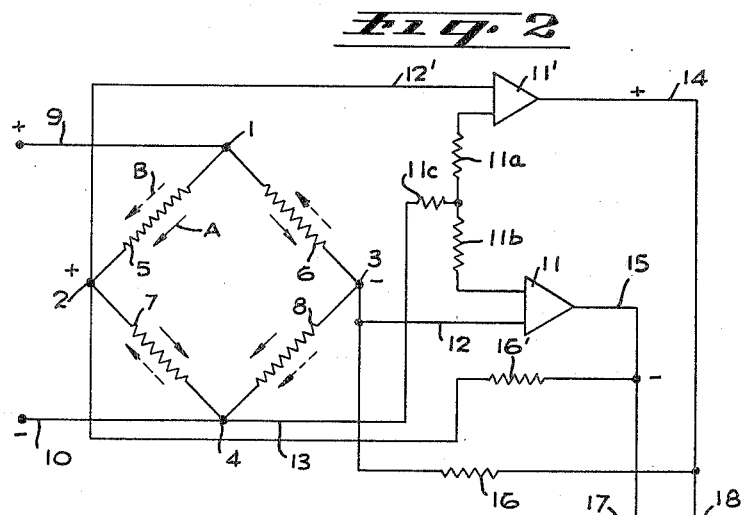

In FIG. 2, the bridge unbalance voltage $E_o$ referred to in FIG. 1 may be reported as a multiple of the unbalance voltage $E_o$, resulting from the unbalancing of the impedances, imposed on the bridge by the condition which caused the bridge in FIG. 1 to become unbalanced. The unbalance voltage across 2 and 3 is amplified in the differential amplifier whose legs 11 and 11' are arranged as a push-pull D.C. amplifier, which input terminals 12 and 12' are connected across 2 and 3. The common line 13 connecting to 11 and 11' is connected to the corner 4 through the resistor 11c and to the biasing resistors 11a and 11b. The positive output 14 of the amplifier is connected to the negative corner 3 through the resistor 16, and the negative terminal 15 is connected to the positive terminal 2 through the resistor 16'. The read out, i.e., the terminals 17 and 18, are connected to any form of intelligence system or telemetery system 14', as is the case in FIG. 1.

Figure 3:
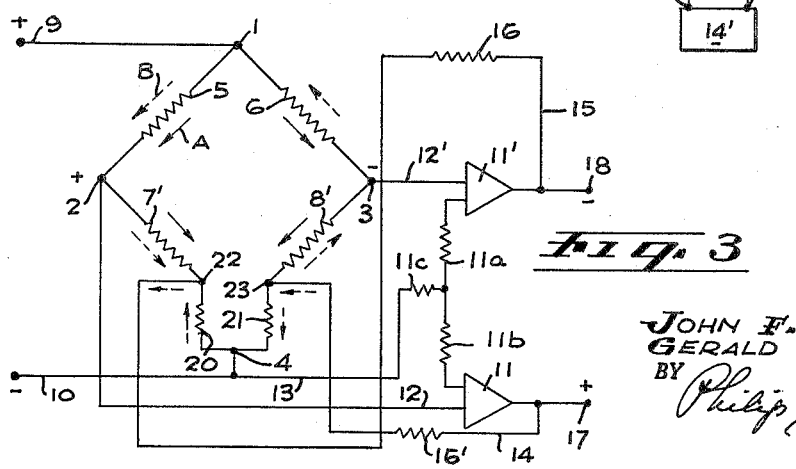

FIG. 3 illustrates a variation of the circuit of FIG. 2 in which the two adjacent arms, for example, 7 and 8, are composed respectively of a resistance 7' and 8', whose resistance is varied by the application of the condition sensed, in combination with a fixed resistance 20 in series with 7', and a fixed resistance 21 in series with 8'. The resistances 20 and 21 are of such value as to make all arms of the bridge of equal resistance value when they are not subjected to variation of impedance by application of the condition sensed by the transducer of which the bridge is the sensing element. The feedback from 14 and 15, through resistances 16 and 16', is in this case connected to the juncture of 22 and 23 respectively, between the variable and fixed resistances, in current assist relationship as shown in FIG. 3.

As in FIGS. 1 and 2, the solid arrows A illustrate the main current from the input 9 and 10, and the arrows B the rebalancing current contribution by the rebalancing current source 14 and 15. In FIG. 2 the feedback from the amplifier passes in the manner indicated by the arrows B through the arms 5 and 6 in series and arms 7 and 8 in series. In FIG. 3, the feedback passes through all of the variable resistances, 8', 6, 5 and 7', in series, which series resistances are in parallel with the fixed resistances 21 and 20 conected in series. The rebalancing current thus distributes itself in the ratio of the resistances of these parallel resistance networks.

Thus, the current contribution represented by the dotted arrows B increases the potential drop across arm 5 and arm 7', and reduces the potential drop in 20. This tends to equalize the potential drop across 1 to 2 as compared to 2 to 4. The contribution of the rebalancing current to the total current is such that it decreases the potential drop in 6 and 8', but increases the potential drop in 21. Since the resistance of 6' is greater than 8', the same change in current will cause a greater difference in the potential difference between 1 and 3 than between 3 and 23. When to this is added the increase in the potential difference across 21, the net effect is to make the potential drop between 1 and 3 more nearly like that between 3 and 4.

We prefer to employ the resistances 20 and 21 to be but a small fraction, about 1 to 5%, of the bridge resistances in order that the dead resistance, i.e., inactive resistance, be as small as possible.

Thus the potential drop in 21 will be increased and that in 20 will be decreased. This will bring the ratios of the potential drops substantially to the equality of Equation 1, to substantially rebalance the bridge.

Giving effect to this relationship, the potential at 2 and 3 may be substantially equalized.

Figure 6:
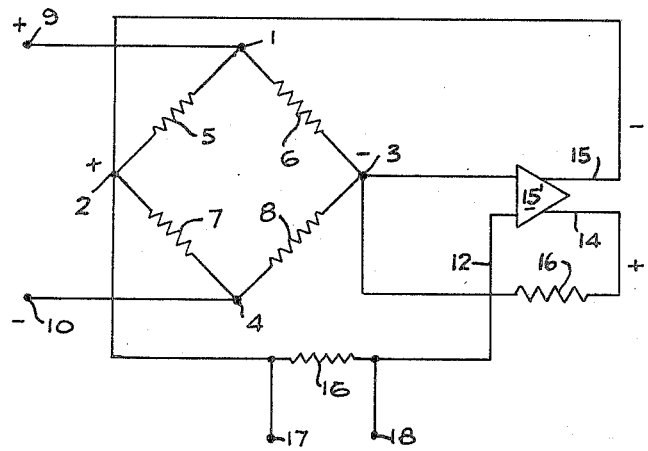

Any D.C. amplifier may be employed, if properly polarized, as is shown in FIG. 6. The output corners 2 and 3 are connected to the input 12 and 13 of the amplifier 15', and the positive output terminal 14 of the amplifier is fed back through resistor 16 to the negative corner 3, and the negative terminal 15 of the amplifier is fed back to the outut corner 2 through resistor 16'. The read out is taken at 17 and 18. The feedback current in the bridge modifies the potentials in the bridge similarly to that of FIGS. 1, 2 and 3.

Figure 4:
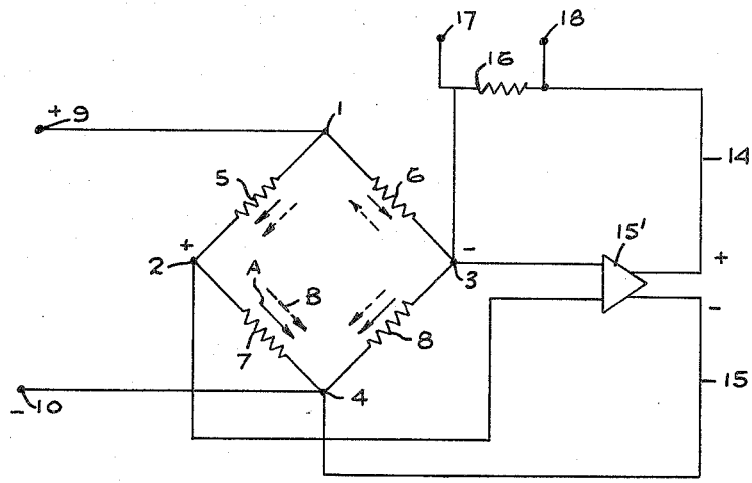

FIG. 4 shows a variation in which the positive output terminal 14 of amplifier 15' is connected to the negative terminal 3, and the amplifier negative output terminal 15 is connected to the corner 4. The read out, at 17 and 18, is taken across the resistance 16, in series with the corner 3. The rebalancing current from 14 passes through 8, which is in parallel with the resistances 6, 5 and 7, which are connected in series with respect to the rebalancing current. The rebalancing current, shown in dotted arrows B, does not materially affect the potential level of point 2, since it passes in series through 5 and 7. The potential at point 2 remains substantially unchanged from that in the unbalanced condition. The rebalancing current passing in opposition to the bridge current, shown as solid arrows A, in arm 6 reduces the potential drop in 6 and, passing in current assist relationship in arm 8, will increase the potential drop in arm 8.

Furthermore, the resistance of arms 7, 6 and 5 in series is $3R-\Delta R$, as compared to $R+\Delta R$ of the arm 8. The rebalancing current will distribute itself between the parallel paths composed of 6, 5 and 7 in series and the parallel resistor 8. The effect on the potential drop in arm 8 is substantially greater than that in the other arms, so that the net effect is to bring the potential at 3 to substantially the same level as at point 2, thus cancelling out the voltage difference between points 2 and 3. The potential at 2 is not altered and the voltage excursion at 3 must be sufficient for purposes of the rebalance.

In FIGS. 2–4 and 6, the system is a closed loop servo-system whereby the error signal, i.e., the bridge unbalance, generates a feedback signal which is negative in nature in a direction to rebalance and substantially to null the unbalance, i.e., the error signal. The loop is thus closed electrically and internally. The effect of the feedback is to degenerate the input signal to the bridge substantially completely, since in practical effect it reduces the signal from the bridge to the amplifier to a substantial null.

Instead of closing the loop electrically and thus automatically, we may close the loop manually. Thus, the error signal is cancelled by a voltage into the bridge from an external source, and the magnitude of the applied voltage is manually or mechanically controlled. The magnitude of the current applied to the bridge from the external source is adjusted until a null sensor reports that the bridge is rebalanced. The magnitude of the current or voltage necessary to be applied to rebalance the bridge is determined as a measure of the bridge unbalance.

Figure 5:
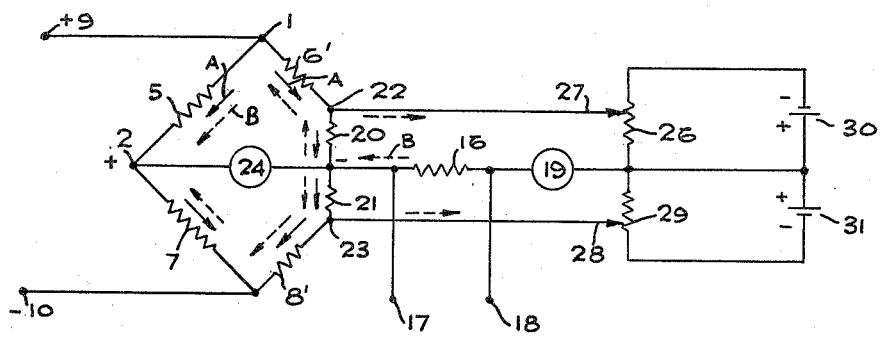

This is illustrated by the system of FIG. 5.

The bridge arms 6' and 8' are connected in series with fixed resistors 20 and 21 sufficient to balance the bridge as in FIG. 3. The output corners 2 and 3 are bridged by a null sensor, for example, a high resistance galvanometer 24 or other device to indicate the magnitude of or absence of a potential difference between 2 and 3. The output 3 is connected through a resistor 16 and, if desired, through the ammeter 19, to midpoint of a voltage divider whose upper leg is the potentiometer 26 and whose lower leg is a potentiometer 29, powered each by batteries or other power source 30 and 31. The slide 27 is connected to 22 at the junction of the resistor 20 and the arm 6', and the slide 28 is connected to 23 at the junction of the resistor 8' and the resistor 21.

When the bridge is unbalanced, as described above, the adjustment of the slides 27 and 28 will cause the application of a rebalancing current or voltage to the bridge, shown by dotted arrows B to modify the bridge current shown by arrows A, to bring the bridge to a balance, as will be indicated by the null sensor 24.

Because of the parallel connections of the arms 6', 5, 7 and 8' with respect to the resistors 20 and 21 and the batteries 30 and 31, the recirculating current modifies the bridge current in arms 5 and 7, so that point 2 will move to a lower positive potential, depending on the magnitude of the impedance variation and the magnitude of the rebalancing current. The potential drop in the arm composed of 6' and 20 is decreased, and that in arms 8' and 21 is increased, to bring corner 3 to substantial balance with corner 2.

The potential across 16 at 17 and 18 or the current indicated by ammeter 19 will be proportional to the original unbalance. In like manner, the position of the slides in the potentiometer resistance may also be calibrated to report this initial unbalance, since the required rebalancing current or voltage will be proportional to the portion of the resistance of the resistors 26 and 29 in series with the bridge.

It will be understood by those skilled in the art that one or the other of the voltage divider legs may be omitted. Thus, the leg composed of the resistor 26, the battery 30, and the connection between 22 and 27 may be omitted. The resistor 20 may conveniently be left in the bridge to obtain the initial zero balance of the bridge.

Figure 7:
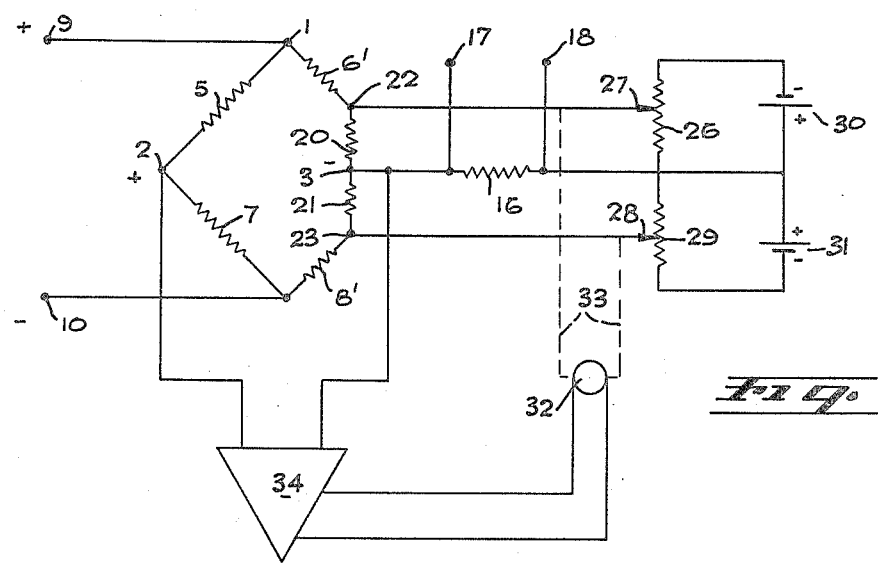

The potentiometer slides 25 and 28 may, however, be adjusted electromechanically, as is illustrated in FIG. 7 in which this modification is applied to the circuit of FIG. 5. The output of the bridge at 2 and 3 is amplified in 34, and the amplified current operates a reversible motor 32, which will actuate the arms 27 and 28 through a mechanical linkage 33, to adjust the slide contacts 27 and 28 up or down in opposite directions to adjust the position of the potentiometer slides 25 and 28, until the rebalancing current and voltage reduce the potential across 2 and 3 to substantially that of the rebalanced null, whereupon the motor becomes inoperative.

It will be recognized that, if the polarities of the bridge unbalance were reverse to that illustrated in FIGS. 2–7, the polarity of the terminals 14 and 15 would become reversed; and the direction of the current flow and the potential of the second voltage and current source, i.e., the amplifiers and batteries, as indicated by the arrows, would become reversed. The second voltage and current source may be related to the input by suitable take off. Thus in FIG. 2 battery 10' may be the same power source as is connected to 9 and 10. Further, while the current is illustrated as a D.C. circuit with D.C. amplification, the potential at 9 and 10 may be alternating or pulsating with suitable change in the nature of the amplifiers and current generators, as will be understood by those skilled in this art.

Figure 8:
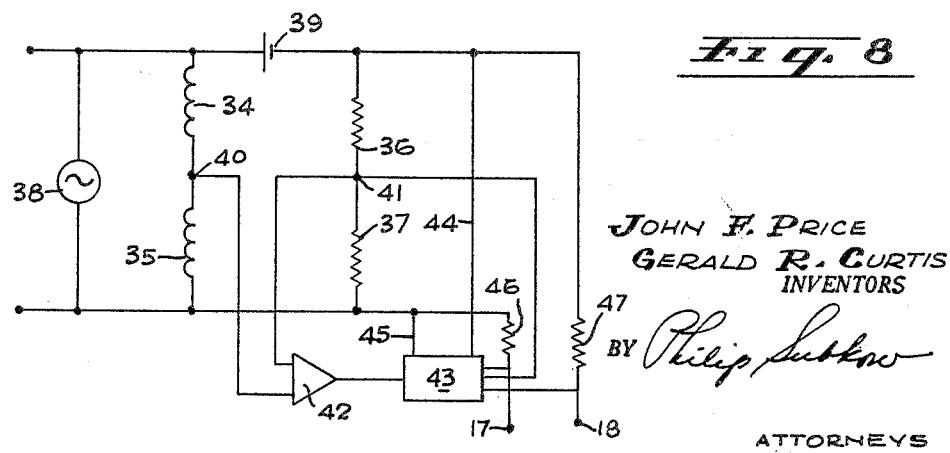

FIG. 8 illustrated a mixed bridge composed of inductive impedances 34 and 35, forming two arms of the Wheatstone bridge, of which the series non-linear resistors 36 and 37 are the other two arms. Such non-linear resistors are commercially available. One form thereof is known as a Varistor. The bridge is powered by an A.C. source 38. The condenser 39 isolates the D.C. side of the bridge from the A.C. side. The output of the bridge at corners 40 and 41 is connected to the amplifier 42, whose output is passed to the phase sensitive synchronous demodulator 43, connected to the A.C. power source by 44 and 45, and the demodulated output is connected across the resistor 36 and 37, through the resistance 46 and 47, with the negative of the output connected to the positive terminal of the unbalanced bridge. The output is taken at 17 and 18 across the output of the demodulator 43.

In the originally balanced condition, the impedances are balanced, and the ratio of the impedances of arms 34 and 35 is equal to the ratio of the resistances 36 and 37. If the resistances 36 or 37 or both are changed, so that one is greater than the other, for example, 36 becomes less than 37, the return current is directed through 36 to increase the potential drop in 36 and decrease that in 37. The output is read across 17 and 18, as indicated above.

In the above circuits the amount of current required to rebalance or null the bridge is independent of the magnitude of the feedback resistance. The current required to rebalance the bridge, and therefore the potential across 16 and 16' or 16 if this alone is used for any change in impedance of the arms of the bridge, the voltage unbalance at the output corners $E_o$ and the bridge resistance are also independent of the magnitude of the feedback resistance.

Therefore, if the rebalancing current is conveyed to the bridge through the feedback resistance 16, or 16 and 16', to establish a second read out voltage $E'_o$ at 17 and 18, the voltage gain of the system "G," i.e., the ratio of $E'_o/E_o$ is substantially the ratio of the feedback resistance or impedance to the bridge resistance or impedance. Thus by employing resistor 16 and 16' whose resistance is greater than the bridge impedance $R_1$, we develop a potential across the resistance R of 16 or 16' or across the resistances 16 and 16' which is greater than the original unbalance which is rebalanced by the rebalancing current. The magnitude of this difference between the developed potential and said original unbalance is determined by the value of G.

Thus, $$\frac{E'_o}{E_o} = G = \frac{R}{R_1}$$

To obtain an output $E_o$ at 17 and 18 which is greater than $E_o$, G is greater than unity and R is greater than $R_1$. Thus by setting the values of the resistances 16 and 16', for any given bridge, we may obtain an output voltage in the desired voltage range, for example in volts where the output $E_o$ is less than the desired potential levels.

The relationship of $E'_o/E_o$ can be precisely maintained provided the amplifier in FIGS. 2–8 has enough open-loop gain to provide sufficient rebalancing current at the maximum value of the impedance change, i.e., the full scale value. The amplifier should have a gain in excess of G, i.e., the ratio of the feedback resistance or impedance to the bridge resistance or impedance. The fact that the voltage gain of this system depends only on the ratio of two resistances or impedances presents many significant advantages. Some of these are listed below:

As long as the gain of the amplifier is maintained beyond the required minimum, it does not matter what the open-loop gain really is. This is evident because current in excess of that required for balance will not be amplified (totally fed back). This means the amplifier need not have the stability or linearity of amplifiers used to amplify low level signals, so long as, over the utilizeable change in impedance $\Delta R$, i.e., full scale value and in the range of temperatures to which the bridge is subjected, the gain of the amplifier is greater than the ratio $E'_0/E_0$ at the full scale value. However, it is preferable that the resistances or impedance of the bridge and the feedback impedances have either a substantially constant resistance or impedance or change but a small amount with changes in temperature or change in the same direction by the same percentage amounts on changes in temperature.

A voltage output which is not sensitive to temperature depends only on the constancy of the voltage powering the bridge. A constant input voltage is normally available.

This methods can be adapted to provide large gain with low impedance output. This is accomplished by inserting "dead" resistance in one or more of the bridge arms; see FIGS. 3, 6 and 7. The rebalancing current is now passed through this dead resistance 21 and 22, which can be a fraction of the resistance of each arm. The feedback resistors 16 or 16 and 16' are of the desired magnitude for a voltage gain desired.

$E_0$ may have a finite value, even though no condition is applied, because the bridge is initially unbalanced in its construction. In conventional bridges, great care and expense are expended to balance the bridge by introducing balancing resistors. The so-called zero, i.e., the output of the bridge when the condition to be sensed is not applied, is, in such initially unbalanced bridge, of finite value. Such balancing resistors may be ussd to initially balance the bridge.

$E_0$ may also change due to changes in temperature, whether or not the bridge is balanced when the transducer is calibrated at the calibrating temperature. This may arise from the effect of temperature on the mechanical parts of the transducer, which cause differential expansion of its parts to cause a change in the impedances of the arms of the bridge. It may also arise from changes in the impedances of the electrical elements of the bridge or bridge circuit.

These problems are present in conventional bridges, such as those employing strain sensitive filaments. It has been solved by various expedients such as introduction of temperature sensitive resistors in series or in parallel with the arms of the bridge. Improved temperature compensating circuits are described in the Perino applications Serial No. 61,612 filed October 10, 1960, now Patent No. 3,085,193, and Serial No. 189,620 filed April 23, 1962 and the Baker application Serial No. 189,517 filed April 23, 1962, now Patent No. 3,111,620, which are incorporated herein by reference.

Appropriate temperature compensating circuits may be employed in combination with the Wheatstone bridge and the Wheatstone bridge circuits where necessary for temperature compensation as will be understood by those skilled in this art.

Instead of or in addition to such temperature compensation methods, we may employ a resistor 16 or 16 and 16', whose resistance change is similar to the change result-in such finite value of $E_0$ on changes in temperature so that $E'_0$ changes in value in such manner that the changes in the value of $E_0$ with temperature are cancelled out. This may be accomplished by adjusting the value of the balancing potential applied to the bridge so that, when no condition is applied, the output at the amplifiers are sufficient to balance the bridge. Thus, for example, the differential amplifiers biasing resistors 11a and 11b are employed, so that the output potential at 14 and 15 may be unbalanced to a degree sufficient to produce an amplifier output E sufficient to balance the bridge to reduce $E_0$ to substantially zero.

The resistors 11a and 11b may be made temperature sensitive, so that they will unbalance the amplifier, to produce the required and opposite potential at 2 and 3. This will balance out the unbalance, i.e., the zero shift, which may be caused by the effect of temperature changes in the transducer and bridge.

If the zero shift is positive, i.e., increases with increases in ambient temperature, one or the other of resistors 11a and 11b may be made to have a positive temperature coefficient, so that the potential difference between 14 and 15 increases as temperature increases, and ideally in an amount sufficient to compensate for the zero shift.

The above expedient may also be employed to balance the bridge at the calibrating temperature when, as a result of manufacture, the bridge at zero shows a finite output $E_0$. The value of the resistors 11a and 11b is initially unbalanced, so that a potential at 14 and 15 is generated sufficient to bring the bridge to balance, to reduce the value of $E_0$ ideally to zero.

Temperature, in addition to changing the value of $E_0$ at zero, may also affect the gain "G" of the system which, as has been shown above, is substantially equal to the ratio, or some fraction of the ratio, of the rebalancing resistor 16 or 16 and 16' to the bridge resistance or impedance seen by the rebalancing current. If this portion of the bridge resistance changes with temperature, even though the value of $E_0$ does not change with temperature due to compensation described above, then the gain "G" may change and the value of $E'_0$ may change. This variation in "G" may be reduced and, ideally, avoided, by employing temperature insensitive impedances in the bridge and temperature insensitive resistors 16 and 16'.

Alternatively, the temperature coefficient of 16 and 16' may be chosen to be substantially equal to the temperature coefficient of that portion of the bridge impedance seen by the rebalancing current.

While we have described the principle of our invention by reference to a resistance bridge, it will be understood that the impedance of the arms need not be resistive. They may be inductive, as in the case of inductive bridges, or capacitative, as in the case of capacitance bridges, with suitable inputs for such purposes.

The span of the transducer, i.e., the $E_0$ for any value of applied condition, may also may also change with temperature. This is compensated for by selecting as the resistors 16, or 16 and 16', a resistor whose resistance changes with temperatures sufficient to compensate for such changes in span.

Where the impedances 16 or 16 and 16' obey the simple Ohm's law, the voltage at 17 and 18 will be directly proportional to the rebalancing current. We may, by employing impedances which do not obey the direct proportionality, obtain output $E'_0$ which has any desired function of the rebalancing current. Thus, for example, by employing a resistance or resistance network, we may obtain continuous functions such as is exemplified by the expression $$E^n = RI$$

where R is the impedance of 16, or 16 and 16'; I is the rebalancing current; and $E^n$ is $E'_0$; and $n$ has a value which is different from 1 and, for example, up to about 10. Such impedances are available commercially (Varistors) where $n$ is in the range of more than 1 and up to 5.

While we have described our invention as applied to Wheatstone bridges in which all four arms are varied in impedance, those skilled in this art will understand that the principles of our invention are applicable to bridges in which less than all the arms may be varied in impedances, so long as at least one arm is so varied in impedance as to establish the potential $E_0$. FIG. 8 illustrates one in which two of the arms are varied in impedance.

One, two or three arms may also be used, as will be understood by those skilled in this art.

While we have described particular embodiments of our invention for purposes of illustration, it should be understood that various modifications and adaptations thereof may be made within the spirit of the invention, as set forth in the appended claims.

We claim:

1. A method of deriving intelligence from a transducer in which a condition sensed by the transducer modifies the impedances of a Wheatstone bridge, which method comprises applying a source of power from a first current source to the input corners of the Wheatstone bridge, applying the condition to be sensed to said transducer and thereby changing the impedance of at least one of the arms of said bridge, thereby to produce an unbalance of said bridge and tending to establish a difference in potential between the output corners of said bridge, continuously circulating a current from a second current source to said bridge while said change in impedance is maintained, said current circulating through a resistance which is substantially greater than the resistance of said bridge, to an output corner of said bridge, said current passing in a direction in said bridge to modify the current in the arms of said bridge, to increase the current flow in one arm of the bridge and to decrease the current flow in an adjacent arm of said bridge, thus reducing the magnitude of said difference in potential substantially to remove said unbalance resulting from said impedance change, and generating a signal as a function of said current from said second named current source passing through said resistance to said output corner responsive to the magnitude of said condition.

2. In combination, a Wheatstone bridge circuit comprising a Wheatstone bridge and means to change the impedance of at least one of the arms of said bridge to unbalance said bridge at the output corners of said bridge, said circuit including means for connecting a source of excitation current to the input corners of said bridge, a second current source electrically connected through a resistance to at least a part of at least one of said arms of said bridge, a pole of said second current source being connected to one of the output corners of said bridge said pole being of potential higher than and of opposite sign to the polarity existing at said one output corner of said bridge, said resistance being greater in value than the impedance of said bridge, and of magnitude sufficient to reduce the potential at said pole to a potential substantially equal to and of opposite sign to the potential at said one of the output corners of said bridge to modify the current in said bridge, passing through said bridge from said excitation current source to substantially remove the voltage unbalance of said bridge resulting from said impedance change, and means responsive to a function of said current from said second named current source and to the degree of said impedance change.

3. In the combination of claim 2, in which said one pole of said second named current source is connected to an output corner of said bridge of opposite polarity through said resistance and the other pole of said bridge is connected to the other output corner of said bridge.

4. In the combination of claim 2, in which one pole of said second current source is connected to one of the corners of said bridge and the other pole of the second current source is connected to an adjacent corner of said bridge.

5. In the combination of claim 2, in which said second named current source is a battery and means to adjust the voltage of said battery applied to said bridge.

6. In the combination of claim 2, in which said second named current source is an amplifier, the input of said amplifier connected to the output corners of said bridge and the output of the amplifier connected to said arm through said resistance.

7. In the combination of claim 6, in which one of the output terminals of said amplifier is connected to one of the output corners of said bridge, and another of the output terminals of said amplifier is connected to the other of the output corners of said bridge.

8. A transducer comprising means responsive to a condition to be sensed applied to said transducer, an electrical resistance strain element, means in said transducer responsive to the condition to be sensed to change the tension of the element in said gage, means to connect said element into a Wheatstone bridge, and means to connect the input corners of said bridge to an excitation current source thereby to tend to establish a voltage unbalance in said bridge at the output corners of said bridge, a continuous current source electrically connected through a resistance to at least a part of at least one of said arms of said bridge, said resistance being greater in value than the resistance of said Wheatstone bridge, a pole of said current source being connected to an output corner of said bridge of polarity opposite to the polarity of said pole of said current source, means to circulate a continuous current from said continuous current source to said bridge, while said condition is applied and said tension is changed thereby, to modify the current in the arms of said bridge passing from said excitation current source, to thereby reduce the voltage unbalance of said bridge resulting from said change in tension in said element of said bridge substantially to remove the said voltage unbalance, and means responsive to a function of said current from said second named source indicative of said condition.

9. In the combination of claim 8, in which one pole of said second named current source is connected to one of the corners of said bridge and the other pole of the current source is connected to an adjacent corner of said bridge through said resistance.

10. In the combination of claim 8, in which said second named current source is a battery and means to adjust the voltage of said battery applied to said bridge.

11. In the combination of claim 8, in which said second named current source is an amplifier, the input of said amplifier connected to said arm through said resistance.

12. In the combination of claim 11, in which one of the output terminals of said amplifier is connected to one of the output corners of said bridge, and another of the output terminals of said amplifier is connected to one of the input corners of said bridge.

13. In the combination of claim 11, in which the output terminals of said amplifier are connected to the output corners of said bridge through said resistance.

References Cited in the file of this patent

UNITED STATES PATENTS

| | | |
|---|---|---|
| 2,278,633 | Bagnall | Apr. 7, 1942 |
| 2,435,254 | Ramberg | Feb. 3, 1948 |
| 2,633,019 | Albrecht | Mar. 31, 1953 |
| 2,984,801 | Pflaum | May 16, 1961 |
| 3,076,129 | Bockemuehl | Jan. 29, 1963 |